US005589857A

United States Patent [19]
Tanahashi et al.

[11] Patent Number: 5,589,857
[45] Date of Patent: Dec. 31, 1996

[54] COORDINATE INPUT DEVICE

[75] Inventors: Makoto Tanahashi, Kanagawa; Kazuyasu Takenaka, Chiba, both of Japan

[73] Assignee: Sony Corporation, Tokyo, Japan

[21] Appl. No.: 350,047

[22] Filed: Nov. 29, 1994

[30] Foreign Application Priority Data

Dec. 7, 1993 [JP] Japan .................................. 5-339879

[51] Int. Cl.⁶ ........................................................ G09G 5/00
[52] U.S. Cl. ............................ 345/174; 345/173; 178/18
[58] Field of Search .................................... 345/173, 174; 178/18, 19, 20

[56] References Cited

U.S. PATENT DOCUMENTS

| | | | |
|---|---|---|---|
| 4,575,580 | 3/1986 | Jandrell | 178/18 |
| 4,897,511 | 1/1990 | Itaya et al. | 178/18 |
| 4,929,934 | 5/1990 | Ueda et al. | 345/174 |
| 5,311,207 | 5/1994 | Kusumoto et al. | 345/173 |
| 5,401,917 | 3/1995 | Yoshida et al. | 178/18 |
| 5,432,304 | 7/1995 | Tanahashi | 345/173 |
| 5,496,974 | 3/1996 | Akebi et al. | 345/174 |

Primary Examiner—Richard Hjerpe
Assistant Examiner—Juliana S. Kim
Attorney, Agent, or Firm—Ronald P. Kananen

[57] ABSTRACT

A coordinate input device includes an input surface in the form of a rectangle and a face-plate switch. The input surface is formed by overlapping a first input detecting member and a spaced second input detecting member. When the input surface is pressed, resistive surfaces of the first and second input detecting members contact each other, and that X-Y coordinate input on the input surface is obtained from the resistance detected at a first or second resistor of the first input detecting member and the resistance detected at one of two other resistors associated with the second input detecting member.

9 Claims, 6 Drawing Sheets

COORDINATE INPUT DEVICE

BACKGROUND OF THE INVENTION

1. Field of the Invention

The present invention relates to coordinate input devices and, more particularly, to a coordinate input device having an input surface which is pushed to be operated.

2. Description of the Related Arts

Image input devices are known, wherein, for example, as a user touches (i.e., pushes) an input surface in the form of a flat plate with a pen or the like, the trace of the pen on the input surface is displayed on a monitor device as an image or stored in a memory device as image data. Such image input devices are used for games and drawing.

In order to detect an input position drawn on an input surface, a coordinate input device is used for detecting the input position, i.e., pushed position, is used as the input surface.

Figure 1:
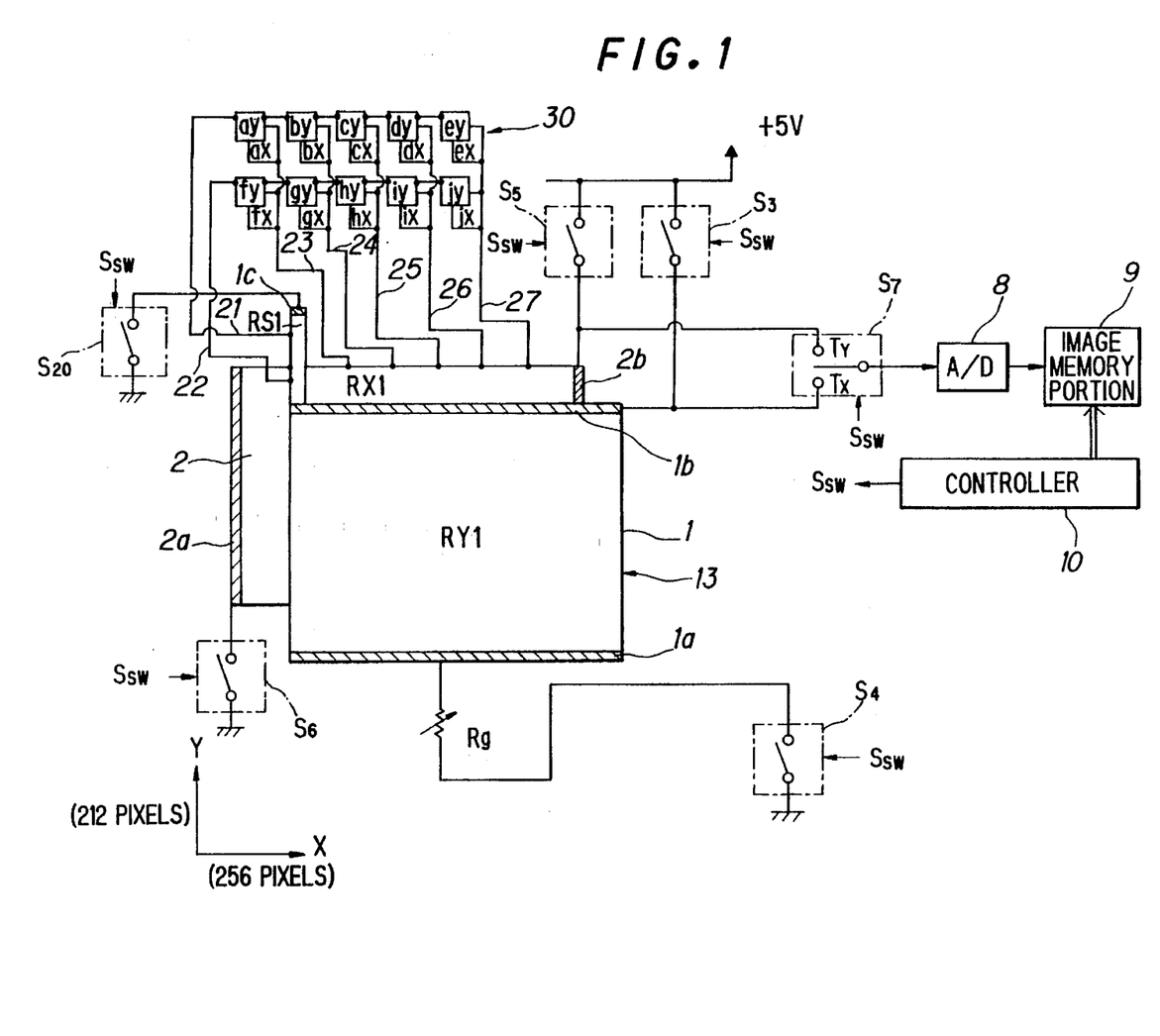
FIG. 1 illustrates a coordinate input device which the present invention addresses.

For example, a coordinate input device is configured as shown in FIG. 1. In FIG. 1, an input detecting member 1 has a resistive surface RY1 in the form of a rectangle and electrodes 1a and 1b formed on both side portions of the resistive surface constituting the longer sides of the rectangle. An input detecting member 2 also has a resistive surface RX1 in the form of a rectangle and electrodes 2a and 2b formed on both side portions of the resistive surfaces constituting the shorter sides of the rectangle.

A voltage of, for example, 5 V is applied to the electrode 1b through a switch $S_3$. The electrode 1a is grounded through an external resistor Rg and a switch $S_4$.

A voltage of, for example, 5 V is applied to the electrode 2b through a switch $S_5$. The electrode 2a is grounded through a switch $S_6$.

The electrode 1b is connected to a terminal $T_x$ of a switch $S_7$ while the electrode 2b is connected to a $T_y$ of the switch $S_7$.

A resistive portion RS1 is connected to the electrode 1b of the input detecting portion 1, the resistive portion RS1 being on the same plane as the resistive surface RY1 but on the reverse side of the plane. An electrode 1c is provided on the other end of the resistive portion RS1.

This electrode 1c is grounded through a switch $S_{20}$. The switches $S_3$, $S_4$, $S_5$, $S_6$, $S_7$ and $S_{20}$ are constituted by semiconductor switches.

Lead wires 21 and 22 are connected to different positions of the resistive portion RS1 provided between the electrodes 1b and 1c. The lead wire 21 is connected to conductors ay, by, cy, dy and ey for face-plate switches. The lead wire 22 is connected to conductors fy, gy, hy, iy and jy for face-plate switches.

Lead wires 23, 24, 25, 26 and 27 are connected to different positions of the resistive surface RX1 of the input detecting member 2. The lead wire 23 is connected to face-plate switch conductors ax and fx. The lead wire 24 is connected to face-plate switch conductors bx and gx. The lead wire 25 is connected to face-plate switch conductors cx and hx. The lead wire 26 is connected to face-plate switch conductors dx and ix. The lead wire 27 is connected to face-plate switch conductors ex and jx.

8 designates an analog-to-digital converter for converting a voltage supplied from the switch $S_7$ into digital data, and 9 designates an image memory portion for storing the digital data output by the A-D converter 8 as an input coordinate value. 10 designates a controller for controlling the operation of the image memory portion 9 and the switching of the switches $S_3$, $S_4$, $S_5$, $S_6$, $S_7$ and $S_{20}$.

Figure 2:
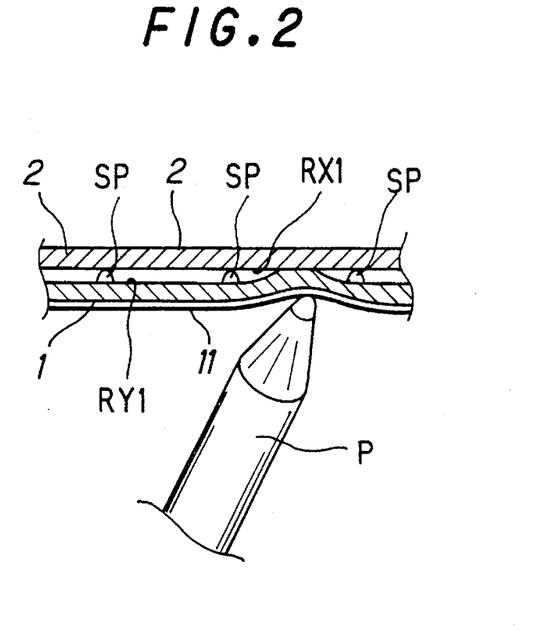
FIG. 2 illustrates how to overlap input detecting members of a coordinate input device.

In this coordinate input device, the input detecting member 1 and 2 are overlapped in a face-to-face relationship with a spacer SP interposed therebetween as shown in FIG. 2 so that the resistive surfaces RX1 and RY1 will not be in contact with each other. The side of a surface sheet 11 is used as an input surface, and an image input device 12 as shown in FIG. 3 is configured using such a coordinate input device.

In the image input device 12, the area 13 indicated by the oblique lines represents the input surface formed by the input detecting members 1 and 2. When a pen P is moved on this input surface 13, the coordinates of each of pushed points are detected by the coordinate input device in FIG. 1 and are stored in the image memory 9. Although not described in detail, by supplying the data stored in this image memory 9 to a monitor device 14 as a picture signal, an image which is the same as the trace drawn on the input surface 13 by the pen P is output as a monitor image.

In this coordinate input device, when a point is pushed with the pen P as shown in FIG. 2, the resistive surfaces RY1 and RX1 electrically contact each other only at the pushed area. The X- and Y-coordinates of the point on the input surface can be obtained by detecting the resistance produced at that time.

Figure 3:
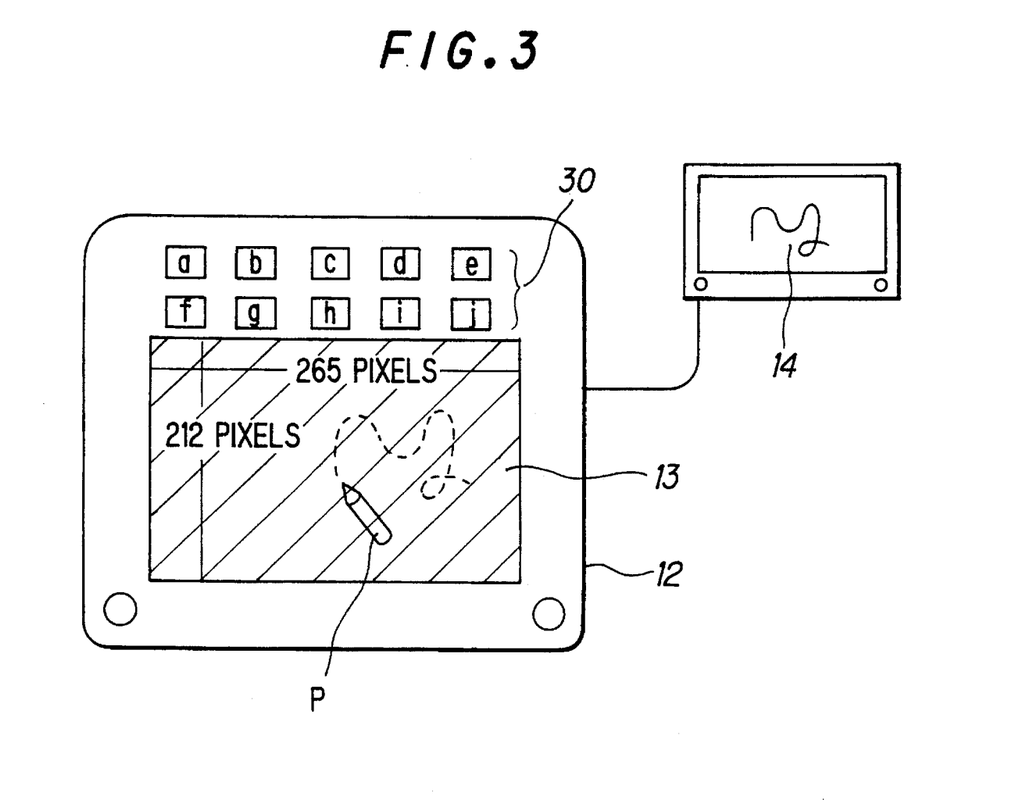
FIG. 3 illustrates an image input device utilizing a coordinate input device.

As shown in FIG. 3, a face-plate switch portion 30 is provided in a position different from that of the input surface 13, and input switches are provided as indicated by a through j.

The input switches a through j are formed by face-plate switch conductors ay–jy and ax–jx.

Figure 4A:
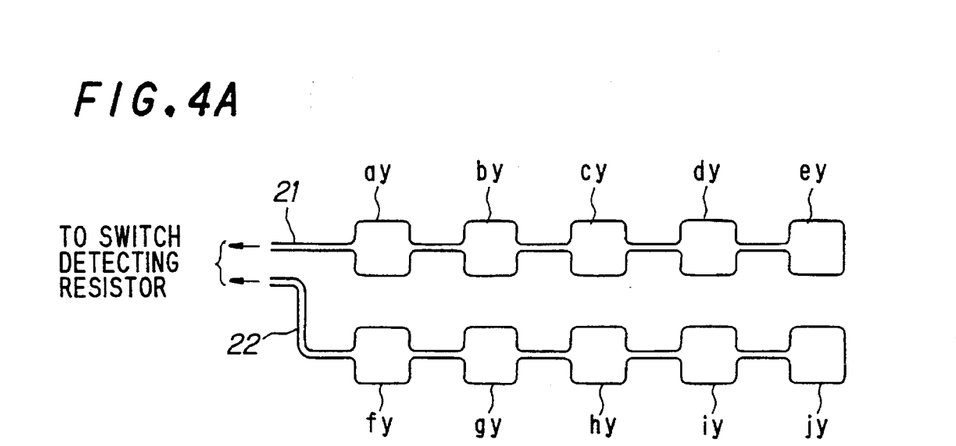
FIGS. 4(a), 4(b) and 4(c) illustrate a face-plate switch portion of a coordinate input device.

As shown in FIG. 4(a), the face-plate switch conductors ay–ey are formed by a conductor, e.g., silver paste, which is continuous with the lead wire 21 while the face-plate switch conductors fy–jy are formed as a conductor which is continuous with the lead wire 22.

Figure 4B:
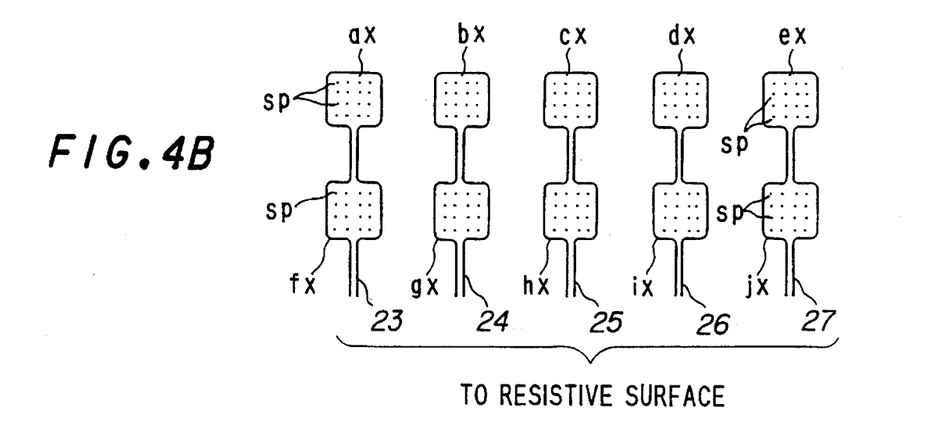

As shown in FIG. 4(b), pairs of the face-plate switch conductors ax and fx, bx and gx, cx and hx, dx and ix, and ex and jx are formed of, e.g., silver paste, as conductors which are continuous with the lead wires 23, 24, 25, 26 and 27. Spacers SP are provided on the face-plate switch conductors ax–jx at predetermined intervals.

As typically illustrated in FIG. 1, pairs of the face-plate switch conductors ax and ay, bx and by, cx and cy . . . , jx and jy are each overlapped.

Figure 4C:
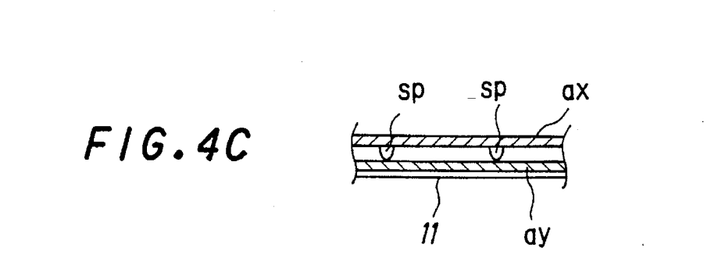

Referring to FIG. 4(c) wherein the face-plate switch conductors ax and ay are shown as an example, the face-plate switch conductors ax and ay are kept away from each other by a spacer SP to form an input switch a.

When the input switch a is pushed by the pen P or the like, the face-plate switch conductors ax and ay contact each other at the pushed position. Detection of the contact between the face-plate switch conductors ax and ay provides detection of the input operation on the input switch a. Input operations on the input switches b–j are similarly detected.

A description will now be made on operations of detecting X- and Y-coordinate values input from the input surface 13 and detecting the input of the input switches a–j in this coordinate input device.

To detect X- and Y-coordinate values input from the input surface 13 and the input of the input switches a–j, the controller in FIG. 1 supplies switch control signals $S_{sw}$ to the switches $S_3$, $S_4$, $S_5$, $S_6$, $S_7$ and $S_{20}$ to enable sequential switching of three kinds of operation modes.

Specifically, the three kinds of operation modes are (1) an X-coordinate detection mode in response to input operations on the input surface 13 or the face-plate switch portion 30, (2) a Y-coordinate detection mode in response to input operations on the face-plate switch portion 30 and (3) a Y-coordinate detection mode in response to input operations on the input surface 13.

The modes (1), (2) and (3) are switched, for example, in a cycle of 1 KHz to allow input from the input surface 13 and the face-plate switch portion 30 to be always responded.

In the X-coordinate detection mode in response to an input operation on the input surface 13 or face-plate switch portion 30, the switches are controlled as follows.

Switch $S_3$: Off
Switch $S_4$: Off
Switch $S_5$: On
Switch $S_6$: On
Switch $S_7$: Connected to $T_x$
Switch $S_{20}$: Off As a result, a voltage of +5 V is applied to the electrode 2b of the input detecting member 2, and the electrode 2a is grounded. Therefore, the voltage on the resistive surface RX1 varies in the direction of the X-axis. For example, in an ideal state, the voltage is 5 V at the area where the surface is in contact with the electrode 2b, 0 V at the area where it is in contact with the electrode 2a, and 2.5 V at the center in the direction of the X-axis thereof.

On the other hand, the electrode 1b acts as a terminal for detecting X-coordinate values for the input detecting member 1. Specifically, the output voltage of the electrode 1b is supplied to the A-D converter 8 through the terminal $T_x$ of the switch $S_7$.

When the resistive surfaces RX1 and RY1 contact each other at a point of the input surface 13 as a result of a push on that point in the state as described above, the voltage of the resistive surface RX1 corresponding to the pushed point, i.e., a voltage as the value of the X-coordinate value, is obtained. This voltage is converted into digital data by the A-D converter 8 and is fetched into the image memory portion 9 as an X-coordinate value.

In this mode, the voltage at the connection between the resistive surface RX1 and the lead wire 23 is applied to the face-plate switch conductors ax and fx. Further, the voltage at the connection between the resistive surface RX1 and the lead wire 24 is applied to the face-plate switch conductors bx and gx; the voltage at the connection between the resistive surface RX1 and the lead wire 25 is applied to the face-plate switch conductors cx and hx; the voltage at the connection between the resistive surface RX1 and the lead wire 26 is applied to the face-plate switch conductors dx and ix; and the voltage at the connection between the resistive surface RX1 and the lead wire 27 is applied to the face-plate switch conductors ex and jx.

Therefore, when any of the input switches a–j of the face-plate switch portion 30 is pushed, the two upper and lower face-plate switch conductors (*x and *y) constituting that input switch contact each other. As a result, the voltage at the connection between the resistive surface RX1 and any one of the lead wires 23–27 (i.e., a voltage as an X-coordinate value) appears at the electrode 1b through the lead wire 21 or 23 and the resistive portion RS.

For example, if the input switch e has been pushed, a voltage corresponding to the position on the resistive surface RX1 to which the lead wire 27 is connected is obtained at the electrode 1b.

This voltage is converted into digital data by the A-D converter 8 and is fetched into the image memory portion 9 as an X-coordinate value.

Thus, referring to the face-plate switch portion 30, it is possible to judge an input switch which has been pushed to be any of "a or f", "b or g", "c or h", "d or i", and "e or j" according to the coordinate value detected in this mode.

As described above, the X-coordinate value for a push on either the input surface 13 or the face-plate switch portion 30 is first detected in the mode (1).

It should be noted that it is not possible at this stage to judge whether the detected X-coordinate value is a result of a push on the input surface 13 or a push on the face-plate switch portion 30.

In the Y-coordinate detection mode in response to an input operation on the face-plate switch portion 30, the switches are controlled as follows.

Switch $S_3$: On
Switch $S_4$: Off
Switch $S_5$: Off
Switch $S_6$: Off
Switch $S_7$: Connected to $T_y$
Switch $S_{20}$: On In this case, a voltage of +5 V is applied to the electrode 1b of the input detecting member 1, and the electrode 1c is grounded. Since the electrode 1a is not grounded at this time, a voltage of +5 V is applied to the resistive portion RS1. Therefore, the voltage at the resistive portion RS1 varies in the direction of the Y-axis. In other words, the connections to the lead wires 21 and 22 have different voltages.

At this time, the electrode 2b acts as a terminal for detecting Y-coordinates for the input detecting member 2. Specifically, the output voltage of the electrode 2b is supplied to the A-D converter 8 through the terminal $T_y$ of the switch $S_7$.

In this state, no Y-coordinate value is obtained for a push on the input surface 13. In other words, the resistive surface RY1 has no resistance distribution as a result of the application of a voltage.

On the other hand, in this mode, the voltage at the connection between the resistive portion RS1 and the lead wire 21 is applied to the face-plate switch conductors ay, by, cy, dy and ey. Further, the voltage at the connection between the resistive portion RS1 and the lead wire 22 is applied to the face-plate switch conductors fy, gy, hy, iy and jy.

Therefore, when any of the input switches a–j of the face-plate switch portion 30 is pushed to cause the two upper and lower face-plate switch conductors (*x and *y) constituting that input switch to contact each other, the voltage at the connection between the resistive portion RS1 and the lead wire 21 or 22 is obtained at the electrode 2b of the input detecting member 2.

This voltage is converted into digital data by the A-D converter 8 and is fetched into the image memory portion 9 as a Y-coordinate value. This Y-coordinate value is a coordinate value which is related to an operation on the face-plate switch portion 30 and from which an input switch which has been pushed can be judged to be "any of a–e" or "any of f–j".

The fact that a Y-coordinate value can be obtained in this mode (2) supports a judgement that the X-coordinate value obtained in the mode (1) was a coordinate value related to an operation on the face-plate switch portion 30, and it is possible to know which of the input switches a–j has been pushed from the combination of the X- and Y-coordinate values.

In the Y-coordinate detection mode in response to an input operation on the input surface 13, the switches are controlled as follows.

Switch $S_3$: On
Switch $S_4$: On
Switch $S_5$: Off
Switch $S_6$: Off
Switch $S_7$: Connected to $T_y$
Switch $S_{20}$: Off In this case, a voltage of +5 V is applied to the electrode 1b of the input detecting member 1, and the electrode 1a is grounded through the external resistor Rg. Since the electrode 1c is not grounded at this time, a voltage of +5 V is applied to the resistive surface RY1. Therefore, the voltage on the resistive surface RY1 varies in the direction of the Y-axis.

In this state, no Y-coordinate value is obtained for a push on the face-plate switch portion 30. In other words, the resistive portion RS1 has no resistance distribution as a result of the application of a voltage.

At this time, the electrode 2b acts as a terminal for detecting Y-coordinates for the input detecting member 2 like in the mode (2). Specifically, the output voltage of the electrode 2b is supplied to the A-D converter 8 through the terminal $T_y$ of the switch $S_7$.

In this state, a voltage on the resistive surface RY1 corresponding to the pushed point on the input surface 13, i.e., a voltage as a Y-coordinate value, is obtained at the electrode 2b. This voltage is converted into digital data by the A-D converter 8 and is fetched into the image memory portion 9 as a Y-coordinate value.

The fact that a Y-coordinate value can be obtained in this mode (3) supports a judgement that the X-coordinate value obtained in the mode (1) was a coordinate value related to an operation on the input surface 13, and the pushed position on the input surface 13 is fetched as the X- and Y-coordinate values.

Such a configuration of the coordinate input device makes it possible to input images etc. and to use the face-plate switch portion 30 as function switches etc. of various types.

Figure 5:
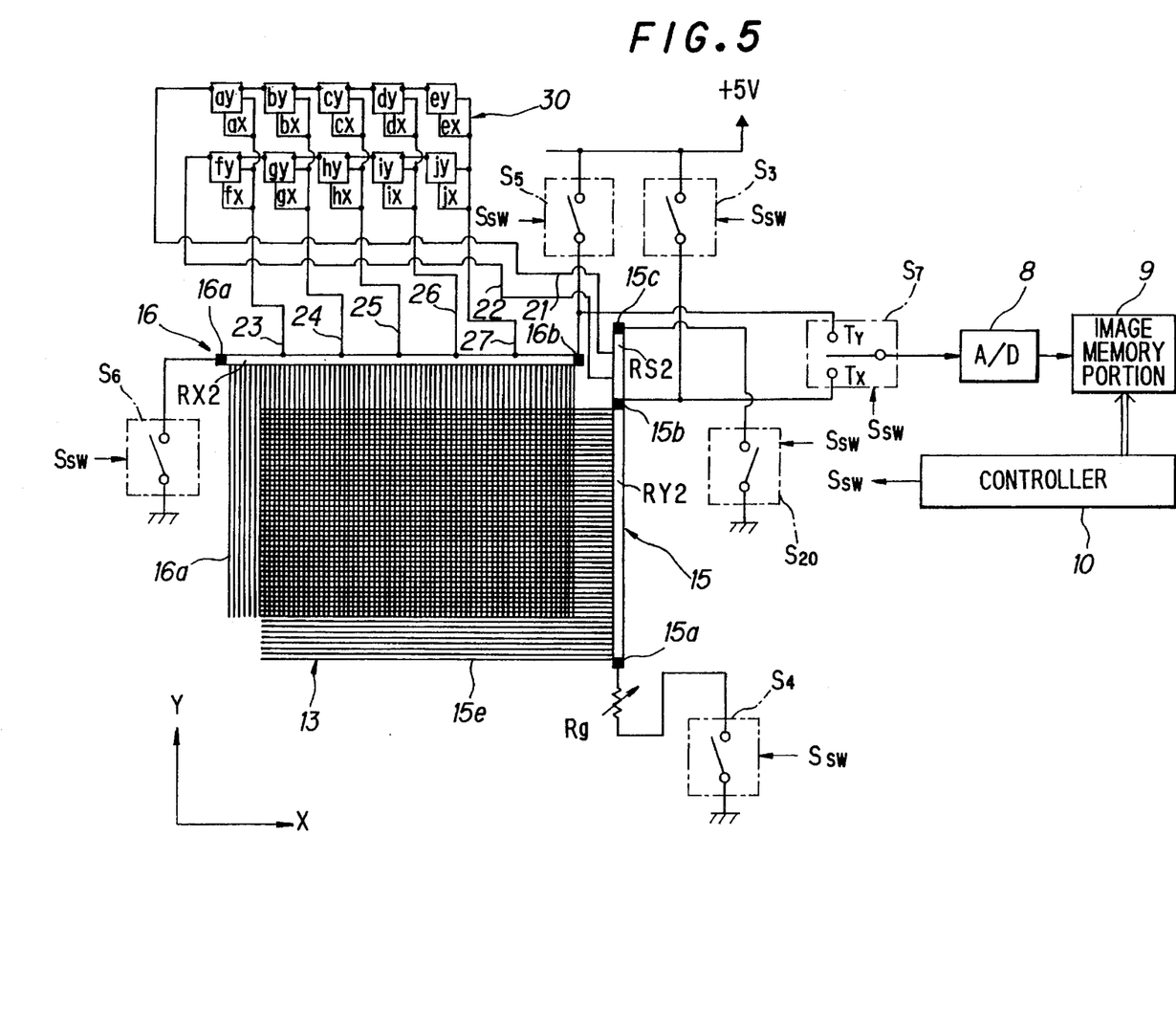
FIG. 5 illustrates another coordinate input device which the present invention addresses.

FIG. 5 shows another example of the configuration of the coordinate input device. Parts identical to those in the configuration in FIG. 3 are given like reference numbers and will not be described to avoid duplication.

In this case, input detecting members 15 and 16 are provided as the input detecting members. The input detecting member 15 has a resistor RY2 formed along a shorter side (in the direction of the Y-axis) of an input surface in the form of a rectangle. Electrodes 15a and 15b are provided on both ends of the resistor RY2, and lead wires 15e are led out from the resistor RY2 in parallel with the X-axis thereof. The lead wires 15e are formed at intervals corresponding to pixels in the direction of the Y-axis.

The input detecting member 16 has a resistor RX2 formed along a longer side (in the direction of the X-axis) of the input surface in the form of a rectangle. Electrodes 16a and 16b are provided on both ends of the resistor RX2, and lead wires 16e are led out from the resistor RX2 in parallel with the Y-axis thereof. The lead wires 16e are formed at intervals corresponding to pixels in the direction of the X-axis.

In addition, a resistive portion RS2 is connected to the electrode 15b of the input detecting member 15 on the same plane as the resistor RY2 but on the reverse side of the plane. An electrode 15c is provided on the other end of the resistive portion RS2.

This electrode 15c is grounded through the switch $S_{20}$.

Lead wires 21 and 22 are connected to different positions of the resistive portion RS2 provided between the electrodes 15b and 15c. The lead wire 21 is connected to face-plate switch conductors ay, by, cy, dy and ey. The lead wire 22 is connected to face-plate switch conductors fy, gy, by, iy and jy.

Lead wires 23, 24, 25, 26 and 27 are connected to different positions of the resistor RX2 of the input detecting member 2. The lead wire 23 is connected to face-plate switch conductors ax and fx. The lead wire 24 is connected to face-plate switch conductors bx and gx. The lead wire 25 is connected to face-plate switch conductors cx and hx. The lead wire 26 is connected to face-plate switch conductors dx and ix. The lead wire 27 is connected to face-plate switch conductors ex and jx.

The coordinate detecting method used here is substantially the same as that in the example in FIG. 1. Specifically, when a point on the input surface 13 is pushed, one of the lead wires 15e and one of the lead wires 16e contact each other. When the switches $S_3$, $S_4$, $S_5$, $S_6$, $S_7$ and $S_{20}$ are in the mode (1), a certain voltage on the resistor RX2 corresponding to the direction of the X-axis is obtained at the electrode 15b. When the switches are in the mode (3), a certain voltage on the resistor RY2 corresponding to the direction of the Y-axis is obtained at the electrode 16b. These voltages are fetched into the image memory portion 9 as coordinate data.

When a certain input switch of the face-plate switch portion 30 is pushed, the upper and lower face-plate switch conductors contact. When the switches $S_3$, $S_4$, $S_5$, $S_6$, $S_7$ and $S_{20}$ are in the mode (1), a voltage on the resistor RX2 corresponding to the connecting position of any one of the lead wires 23–27 is obtained at the electrode 15b. When the switches are in the mode (2), a voltage on the resistive portion RS corresponding to the connecting position of the lead wire 21 or 22 is obtained at the electrode 16b. As a result, it is judged which of the input switches a–j has been operated.

In such a coordinate input device, the X-Y coordinate detecting area on the input surface 13 is generally set in the form of a rectangle to comply with, for example, the monitor screen 14 of the image input device as shown in FIG. 3. In other words, the lengths of the X- and X-axes are different from each other.

Since the X- and Y-axes as the coordinate axes are different, the numbers of pixels assigned to the X- and Y-directions are different on the memory for storing detected coordinate data.

However, if the same voltage is applied to the X-axis resistor RX2 and the Y-axis resistor RY2 and voltages obtained for coordinates on the X- and Y-axes are converted into digital data using the same A-D converter 8, the coordinate data obtained from the A-D converter 8 will not be compatible with the memory pixel assigned to the coordinate in the image memory portion 9.

For example, assume that the ratio between the sizes of the X- and Y-coordinates and the ratio between the numbers of pixels assigned to the X- and Y-coordinates are both 256:212; the same voltage of 5 V is applied to both of the resistors RX2 and RY2 for detection along X- and Y-axes, respectively; and data conversion is performed using an A-D converter 8 having resolution of 256. In this case, detection of an X-coordinate can be performed without problem because a voltage corresponding to an input position in the direction of the X-axis is processed by the A-D converter 8 of resolution of 256 and is stored in a memory having 256 memory pixels in the image memory portion 9.

However, to detect a Y-coordinate, a voltage corresponding to an input position in the direction of the Y-axis must be converted by the A-D converter 8 of resolution of 256 into data in 212 steps corresponding to memory pixels. It is of course very difficult to do this, and the Y-coordinate data can not be properly processed in the image memory portion 9.

In order to solve this problem, for example, the external resistor Rg is connected to the Y-axis (the direction of the shorter sides) in series through the electrode 1a as shown in FIG. 1. The value of the external resistor Rg is chosen so that the voltage (excluding the voltage applied to the external resistor Rg) applied to the resistor RY2 of the Y-axis input coordinate surface will be equal to the ratio of the length of the Y-axis to the length of the X-axis. Specifically, in the example wherein X:Y=256:212, a relationship that RY2:Rg=212:44 is to be satisfied. Thus, the voltage detected on the resistor RY2 is adapted to the resolution of 256 to solve the above-described problem.

The adjustment using the external resistor Rg is also employed in the example of configuration in shown in FIG. 1 to solve the problem associated with the ratio between the X and Y pixels.

However, in general, the resistance of the resistive flat plates for detecting coordinates, i.e., the resistive surfaces RX1 and RX2 for the X-axis plane and the resistive surfaces RY1 and RY2 for the Y-axis plane is not so accurately controlled.

Although the resistance of the resistive surfaces per unit area can be made substantially uniform by forming the resistive surfaces by printing, the resistance of completed input detecting members as a whole varies from member to member within the range of about ±20%.

Therefore, the external resistor Rg must be a variable resistor and, in order to solve the problem associated with the ratio between the X- and Y-pixels, the resistance of the external resistor Rg must be adjusted for each coordinate input device during manufacture so that RY1 (and RY2): Rg will be adjusted to the above described ratio (or an integral multiple thereof).

In other words, the above-described coordinate input device has had a problem in that the addition of the external resistor Rg increases the number of parts and the cost of the device and in that the adjustment of the resistance of the external resistor Rg reduces processing efficiency.

Further, when it is attempted to perform detection not only on the input surface 13 but also on input on the face-plate switch portion 30 as described above, it is necessary to provide the resistive portion RS, electrode 1c (or 15c) and switch 20. Especially, wiring is required at three positions on the input detecting member to accommodate the electrodes 1a, 1b and 1c, which has resulted in a problem in that the circuit configuration and the routing of the printed wires become complicated.

In addition, the fact that one coordinate detecting operation involves three modes of operation as described above has resulted in an increase in the time required for the detecting operation.

SUMMARY OF THE INVENTION

It is therefore an object of the present invention to provide a coordinate input device which solves the above-mentioned problems.

According to the present invention, there is provided a coordinate input device including an input surface in the form of a rectangle and at least one face-plate switch. The input surface is formed by overlapping a first input detecting member and a second input detecting member so that they will not contact each other. First and second electrodes are provided on both side portions at the shorter sides of a rectangular resistive surface of the first input detecting member, and a voltage is applied between the first and second electrodes. Third and fourth electrodes are provided on both side portions at the longer sides of a rectangular resistive surface of the second input detecting member, and a fifth electrode is connected to the fourth electrode through a resistive portion, a voltage being applied between the third and fifth electrodes. When the input surface is pushed, the resistive surfaces of the first and second input detecting members contact each other at the pushed area. The coordinate of the input in the X-Y coordinate system on the input surface is obtained from the resistance at the first or second resistor of the first input detecting member and the resistance detected at the third or fifth electrode of the second input detecting member at that time. The face-plate switch is formed by overlapping at least one first face-plate switch conductor portion and at least a second switch conductor portion so that they will not contact each other. The first switch conductor portion is electrically connected to a predetermined position in the area extending from the first electrode of the first input detecting member through the resistive portion up to the second electrode. The second switch conductor portion is electrically connected to a predetermined position in the area extending from the fourth electrode of the second input detecting member through the resistive portion up to the fifth electrode. When a push on the face-plate switch causes the first and second face-plate switch conductor portions to contact each other, the input using the face-plate switch is detected from the resistance detected at the third or fifth electrode of the second input detecting member.

According to the present invention, there is provided a coordinate input device including an input surface in the form of a rectangle and at least one face-plate switch. The input surface is constituted by a first input detecting member and a second input detecting member. The first input detecting member has a first resistor which is provided along one of the longer sides of the rectangular input surface and which has first and second electrodes on both ends thereof. A voltage is applied between the first and second electrodes, and lead wires are provided on the first resistor in parallel with the direction of the shorter sides of the input surface at intervals corresponding to pixels. The second input detecting member has a second resistor which is provided along one of the shorter sides of the rectangular input surface and which has third and fourth electrodes on both ends thereof. The second resistor is provided with lead wires which extend in parallel with the direction of the longer sides of the input surface at intervals corresponding to pixels, and a fifth resistor is connected to the fourth resistor through a resistive portion. A voltage is applied between the third and fifth resistors. The lead wires of the first and second input detecting members are overlapped in the form of a matrix so that they will not contact each other. The face-plate switch is configured by overlapping at least one first face-plate switch conductor portion and at least one face-plate switch conductor portion so that they will not contact each other. The first switch conductor portion is electrically connected to a predetermined position in the area extending from the first electrode of the first input detecting member through the resistive portion up to the second electrode. The second switch conductor portion is electrically connected to a predetermined position in the area extending from the fourth electrode of the second input detecting member through the resistive portion up to the fifth electrode. When the input surface is pushed, the lead wires of the first and second input detecting members at the pushed area contact each other, and that X-Y coordinate on the input surface is obtained from resistance detected at the first or second resistor of the first input detecting member and the resistance detected at the first or third electrode of the second input detecting member at that time. When a push on the face-plate switch causes the first and second face-plate switch conductor portions to contact each other, the input using the face-plate switch is detected from the resistance at the first or second resistor of the first input detecting member and the resistance detected at the third or fifth electrode of the second input detecting member.

According to the present invention, a resistive surface for coordinate detection is provided between the first and third electrodes of the second input detecting member, and a voltage is applied to a resistive surface for detecting operations on the face-plate switch. This makes it possible to simplify the circuit configuration and wiring.

According to the present invention, the resistive portion provided between the second and third electrodes serves also as a correction resistor for correcting problems associated with the ratio between the pixels in X- and Y-directions on the input surface.

DETAILED DESCRIPTION OF THE PREFERRED EMBODIMENTS

Coordinate input devices according to the present invention will now be described in detail with reference to the accompanying drawings.

Figure 6:
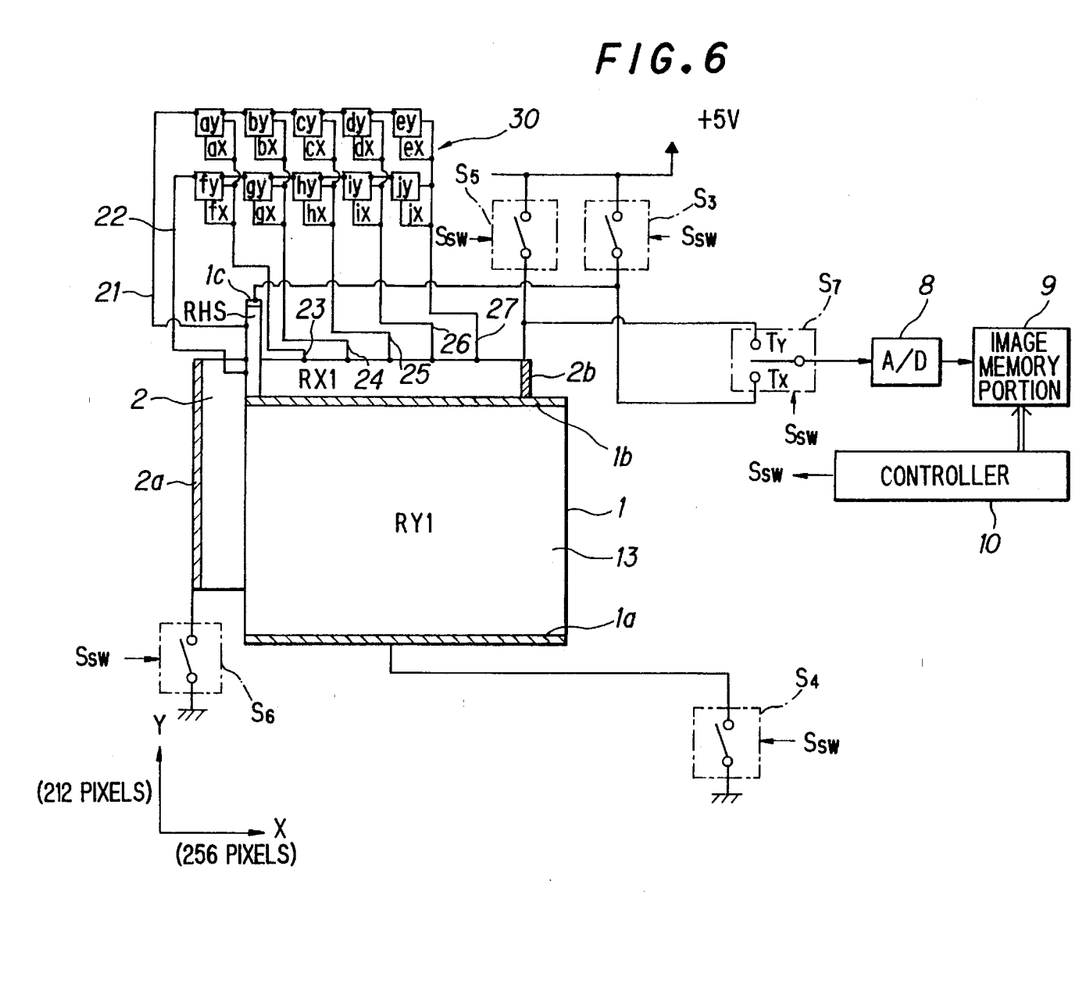
FIG. 6 illustrates a first embodiment of a coordinate input device of the present invention.

A first embodiment of the present invention is shown in FIG. 6. This first embodiment performs detection of input coordinates in the same manner as that for the coordinate input device shown in FIG. 1. The same parts as those in FIG. 1 are given like reference numbers and will not be described in detail here.

In this first embodiment, an input detecting member 1 has a resistive surface RY1 in the form of a rectangle and electrodes 1a and 1b formed on both side portions of the resistive surface which constitute the longer sides of the rectangle. An input detecting member 2 also has a resistive surface RX1 in the form of a rectangle and electrodes 2a and 2b formed on both side portions of the resistive surface which constitute the shorter sides of the rectangle.

A resistive portion RSH is formed to extend from the electrode 1b on the same plane as the resistive surface RY1 but on the reverse side of the plane. An electrode 1c is connected to the other end of the resistive portion RSH.

A voltage of, for example, 5 V is applied to the electrode 1c through a switch $S_3$. The electrode 1a is grounded through a switch $S_4$. A voltage of, for example, 5 V is applied to the electrode 2b through a switch $S_5$. The electrode 2a is grounded through a switch $S_6$.

Further, the electrode 1c is connected to a terminal $T_x$ of a switch $S_7$ while the electrode 2b is connected to a terminal $T_y$ of the switch $S_7$.

Lead wires 21 and 22 are connected to different positions of the resistive portion RSH. The lead wire 21 is connected to face-plate switch conductors ay, by, cy, dy and ey. The lead wire 22 is connected to face-plate switch conductors fy, gy, hy, iy and jy.

Lead wires 23, 24, 25, 26 and 27 are connected to different positions of the resistive surface RX1 of the input detecting member 2. The lead wire 23 is connected to face-plate switch conductors ax and fx. The lead wire 24 is connected to face-plate switch conductors bx and gx. The lead wire 25 is connected to face-plate switch conductors cx and hx. The lead wire 26 is connected to face-plate switch conductors dx and ix. The lead wire 27 is connected to face-plate switch conductors ex and jx.

The face-plate switch conductors ax–jx and ay–jy are configured as described above with reference to FIGS. 4(a), 4(b) and 4(c) to form input switches a–j whereby a face-plate switch portion 30 as shown in FIG. 3 is configured.

A description will now be made on operations of detecting X- and Y-coordinate values input from an input surface 13 and detecting inputs on the input switches a–j in this coordinate input device.

In this case, a controller 10 in FIG. 6 can detect X- and Y-coordinate values input from the input surface 13 and inputs on the input switches a–j by simply switching two kinds of operation modes sequentially. Specifically, it supplies switch control signals $S_{sw}$ to the switches $S_3$, $S_4$, $S_5$, $S_6$, and $S_7$ to switch an X-coordinate detection mode and a Y-coordinate detection mode, for example, in a cycle of 1 KHz. In the X-coordinate detection mode, the switches are controlled as follows.

Switch $S_3$: Off
Switch $S_4$: Off
Switch $S_5$: On
Switch $S_6$: On
Switch $S_7$: Connected to $T_x$ As a result, a voltage of +5 V is applied to the electrode 2b of the input detecting member 2, and the electrode 2a is grounded. Therefore, the voltage on the resistive surface RX1 varies in the direction of the X-axis.

On the other hand, the electrode 1b acts as a terminal for detecting X-coordinates for the input detecting member 1. Specifically, the output voltage of the electrode 1b is supplied to an A-D converter 8 through the terminal $T_x$ of the switch $S_7$.

When the resistive surfaces RX1 and RY1 contact each other at a point on the input surface 13 as a result of a push on that point in the state as described above, the voltage of the resistive surface RX1 corresponding to the pushed point, i.e., a voltage as the value of the X-coordinate, is obtained. This voltage is converted into digital data by the A-D converter 8 and is fetched into an image memory portion 9 as an X-coordinate value.

When one of the input switches a–j of the face-plate switch portion 30 is pushed, a voltage corresponding to the position on the resistive surface RX1 to which any of the lead wires 23–27 is connected is obtained at the electrode 1c. In other words, it is possible to judge an input switch which has been pushed to be any of "a or f", "b or g", "c or h", "d or i", and "e or j".

As described above, the X-coordinate value for a push on either the input surface 13 or the face-plate switch portion 30 is first detected in the X-coordinate detection mode.

It should be noted that it is not possible at this stage to judge whether the detected X-coordinate value is a result of a push on the input surface 13 or a push on the face-plate switch portion 30.

In the Y-coordinate detection mode, the switches are controlled as follows.

Switch $S_3$: On
Switch $S_4$: Off
Switch $S_5$: Off
Switch $S_6$: Off
Switch $S_7$: Connected to $T_y$ In this case, a voltage of +5 V is applied to the electrode 1c of the input detecting member 1, and the electrode 1a is grounded. As a result, a voltage of +5 V is applied to the resistive portion RSH and the resistive surface RY1. Therefore, the voltage at the resistive portion RSH and the resistive surface RY1 varies in the direction of the Y-axis. In other words, the connections to the lead wires 21 and 22 and positions on the resistive portion RSH which are different from each other in the Y-direction have different voltages.

At this time, the electrode 2b acts as a terminal for detecting Y-coordinates for the input detecting member 2. Specifically, the output voltage of the electrode 2b is supplied to the A-D converter 8 through the terminal $T_y$ of the switch $S_7$.

When the input surface 13 has been pushed, the voltage of the resistive surface RY1 corresponding to the pushed point, i.e., a voltage as the value of the Y-coordinate, is obtained in this mode. This voltage is converted into digital data by the A-D converter 8 and is fetched into the image memory portion 9 as a Y-coordinate value.

Further, when any of the input switches of the face-plate switch portion 30 has been pushed to cause the two (upper and lower) face-plate switch conductors (*x and *y) constituting that input switch to contact each other, the voltage at the connection between the resistive portion RSH and the lead wire 21 or 22 is obtained at the electrode 2b of the input detecting member 2.

This voltage is converted into digital data by the A-D converter 8 and is fetched into the image memory portion 9 as a Y-coordinate value. This Y-coordinate value is a coordinate value which is related to an operation on the face-plate switch portion 30 and from which an input switch which has been pushed can be judged to be "any of a–e" or "any of f–j".

Specifically, since the voltages at points on the resistive portion RSH and the voltages at points on the resistive surface RY1 are different, it is possible to determine from those voltages whether the detected Y-coordinate value is associated with the input surface 13 or the face-plate switch portion 30.

If the Y-coordinate value corresponds to a voltage on the resistive surface RY1, the X-coordinate value obtained in the X-coordinate detection mode can be judged to be a coordinate value related to an operation on the input surface 13. As a result, the pushed position on the input surface 13 is fetched into the image memory 9 as the X- and Y-coordinate values.

If the Y-coordinate value corresponds to a voltage on the resistive portion RSH, the X-coordinate value obtained in the X-coordinate detection mode can be judged to be a coordinate value related to an operation on the face-plate switch portion 30. As a result, it is possible to know which of the input switches a–j has been pushed from the combination of the X- and Y-coordinate values.

Such a coordinate input device according to the first embodiment as described above makes it possible to input images etc. and, where the face-plate switch portion 30 can be used as function switches etc. of various types, one coordinate detecting operation can be completed in two modes to increase processing speed.

As apparent from FIG. 6 and the method of detection described above, the need for wiring the electrode 2b of the input detecting member 1 is eliminated. In addition, the switch 20 which is required in the example in FIG. 1 can be deleted. This makes it possible to simplify the circuit configuration and wiring.

Assume that there are 256 pixels along the X-axis; there are 212 pixels along the Y-axis; and the resolution of the A-D converter is 256. Then, when a Y-coordinate value associated with the input portion 13 is detected, the detected voltage will not be compatible with the resolution of the A-D converter and the number of pixels stored in the image memory 10. In order to solve this, the present embodiment uses the resistive portion RSH also as a correction resistor.

The resistive portion RSH is formed of the same resistor material as that for the resistive surface RY1 and through the same printing process.

As described above, a voltage of 5 V is applied between the electrodes 1c and 1a in the Y-coordinate detection mode while a voltage of 5 V is applied between the electrodes 2a and 2b in the X-coordinate detection mode.

For the X-axis detection, the voltage of 5 V applied between the electrodes 2a and 2b is detected as X-coordinate data which is a result of voltage division into 256 steps on the resistive surface RX because the resolution of the A-D converter 8 is 256. For the Y-axis detection, the A-D converter 8 of resolution of 256 can properly extract coordinate data for 212 pixels from an input on the input surface 13 when the same voltage of 5 V is applied between the electrodes 1c and 1a, if the ratio of the resistance between the electrodes 1b and 1a to the resistance between the electrodes 1c and 1b, i.e., RY1:RSH, is set at 212:(256-212), i.e., 212:44.

In other words, the resistive portion RSH is formed to perform voltage adjustment such that the voltage applied to the resistive surface RY1 for Y-axis detection will be equal to the ratio of the length of the Y-axis to the length of the X-axis.

In general, the resistance R of a square resistor surface sandwiched between electrodes provided on opposite sides of the square is inversely proportional to the length (L) of the electrodes and proportional to the distance (d) between the opposite electrodes. Therefore, the resistance R is expressed as R=r×d/L where r represents the resistance per unit area of the resistor material. The ratio between the resistance values (RY1:RSH) can be decided by forming the resistive portion RSH using the same material and printing process as those for the resistor for the resistive surface RY1 and by appropriately choosing the length (L) of the resistive portion RSH and the distance (d) between the electrodes.

Specifically, since the same material is used, the ratio between the resistance values (RY1:RSH) can be automatically decided if the dimensions of the resistive surface RY1 and resistive portion RSH are decided. So, the ratio between the resistance values (RY1:RSH) can be automatically decided regardless of variation in the resistor material, i.e., the resistance between the electrodes. This means that if a predetermined voltage, e.g., 5 V, is applied between the electrodes 1c and 1a during Y-axis coordinate detection, the target voltage on the resistive surface RY1, i.e., voltage distribution in 212 steps which complies with the resolution of the A-D converter 8, can be obtained without the need for adjustment.

Thus, this first embodiment provides a more significant advantage in that the resistive portion RSH can be used to eliminate the adjustment of the voltage applied to the resistive surface RY1 for Y-axis detection which is otherwise required due to difference between the numbers of pixels in X- and Y-directions and which is to be otherwise performed using a variable resistor.

Although the electrodes 1c and 2b are used as electrodes for obtaining the voltages detected on the resistive surfaces RX1 and RY1 (and RSH) in the above-described first embodiment, the electrodes 1a and 2a may be used instead. Alternatively, the voltages may be obtained from two electrodes.

Figure 7:
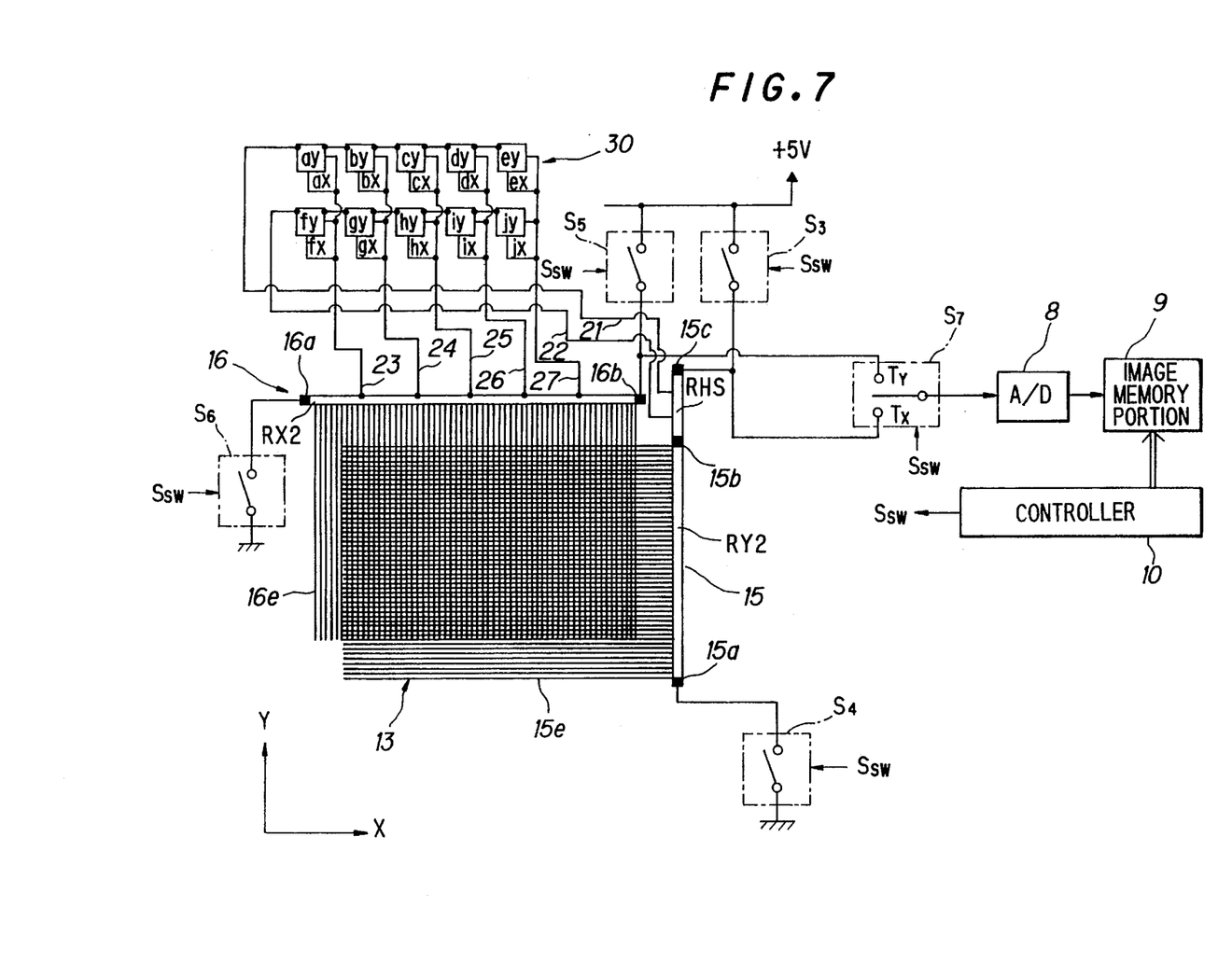
FIG. 7 illustrates a second embodiment of a coordinate input device of the present invention.

A second embodiment of the present invention is shown in FIG. 7. This second embodiment performs detection of input coordinates in the same manner as that for the coordinate input device shown in FIG. 5. The same parts as those in FIG. 5 are given like reference numbers and will not be described in detail here.

In this case, an input detecting member 15 has a resistor RY2 formed along a shorter side (in the direction of the Y-axis) of an input surface in the form of a rectangle. Electrodes 15a and 15b are provided on both ends of the resistor RY2, and lead wires 15e are led out from the resistor RY2 in parallel with the X-axis thereof. The lead wires 15e are formed at intervals corresponding to pixels in the direction of the Y-axis.

The input detecting member 16 has a resistor RX2 formed along a longer side (in the direction of the X-axis) of the input surface in the form of a rectangle. Electrodes 16a and 16b are provided on both ends of the resistor RX2, and lead wires 16e are led out from the resistor RX2 in parallel with the Y-axis thereof. The lead wires 16e are formed at intervals corresponding to pixels in the direction of the X-axis.

In addition, a resistive portion RSH is connected to the electrode 15b of the input detecting member 15 on the same plane as the resistor RY2 but on the reverse side of the plane. An electrode 15c is provided on the other end of the resistive portion RSH.

A voltage of, for example, 5 V is applied to the electrode 15c through a switch $S_3$. The electrode 15a is grounded through a switch $S_4$. A voltage of, for example, 5 V is applied to the electrode 16b through a switch $S_5$. The electrode 16a is grounded through a switch $S_6$. Further, the electrode 15c is connected to a terminal $T_x$ of a switch $S_7$ while the electrode 16b is connected to a terminal $T_y$ of the switch $S_7$.

Lead wires 21 and 22 are connected to different positions of the resistive portion RSH provided between the electrodes 15b and 15c. The lead wire 21 is connected to face-plate switch conductors ay, by, cy, dy and ey. The lead wire 22 is connected to face-plate switch conductors fy, gy, hy, iy and jy.

Lead wires 23, 24, 25, 26 and 27 are connected to different positions of the resistor RX2 of the input detecting member 2. The lead wire 23 is connected to face-plate switch conductors ax and fx. The lead wire 24 is connected to face-plate switch conductors bx and gx. The lead wire 25 is connected to face-plate switch conductors cx and hx. The lead wire 26 is connected to face-plate switch conductors dx and ix. The lead wire 27 is connected to face-plate switch conductors ex and jx.

The coordinate detecting method used here is performed in two modes of operation in substantially the same manner as in the first embodiment. When a point on the input surface 13 is pushed, one of the lead wires 15e and one of the lead wires 16e contact each other. When the switches $S_3$, $S_4$, $S_5$, $S_6$, and $S_7$ are in the X-axis detection mode, a certain voltage on the resistor RX2 corresponding to the direction of the X-axis is obtained at the electrode 15c. When the switches are in the Y-axis detection mode, a certain voltage on the resistor RY2 corresponding to the direction of the Y-axis is obtained at the electrode 16b. These voltages are fetched into a image memory portion 9 as coordinate data.

When a certain input switch of a face-plate switch portion 30 is pushed, the upper and lower face-plate switch conductors contact each other. When the switches $S_3$, $S_4$, $S_5$, $S_6$, and $S_7$ are in the X-axis detection mode, a voltage on the resistor RX2 corresponding to the connecting position of any of the lead wires 23–27 is obtained at the electrode 15c. When the switches are in the Y-axis detection mode, a voltage on the resistive portion RSH corresponding to the connecting position of the lead wire 21 or 22 is obtained at the electrode 16b. As a result, it is judged which of the input switches a–j has been operated.

This second embodiment also simplifies the circuit configuration and wiring and increases the processing speed by completing one detecting operating in two modes of operation.

Again in this second embodiment, if it is assumed that there are 256 pixels along the X-axis; there are 212 pixels along the Y-axis; and the resolution of the A-D converter is 256, when a Y-coordinate value associated with the input portion 13 is detected, the detected voltage will not be compatible with the resolution of the A-D converter and the number of pixels stored in the image memory portion 9. In order to solve this problem, the resistive portion RSH is used also as a correction resistor.

Specifically, although the voltage of 5 V applied during the Y-axis detection is applied between the electrodes 15c and 15a, the ratio of the resistance between the electrodes 15b and 15a to the resistance between the electrodes 15c and 15c, i.e., RY2:RSH, is adjusted at 212:44 by the resistive portion RSH. In other words, the voltage detected on the resistor RY2 is properly digitized into 212 steps to be compatible with the resolution of 256 of the A-D converter.

In other words, a coordinate input device utilizing input detecting members having such a configuration can provide the same advantage as that in the first embodiment. Specifically, the ratio between the resistance values (RY2:RSH) can be decided only by setting the dimensions of the resistor RY2 and the correction resistor RSH if they are simultaneously formed of the same resistive material and, therefore, no adjustment is required.

The present invention is not limited to the embodiments as described above and various modifications thereto are possible within the spirit and scope of the invention.

Especially, it is not necessary to provide the resistive surface RY2 and the resistive portion RSH in positions where they physically adjoin with the electrode interposed therebetween. Instead, they may be spaced apart using a lead wire. The shape of the surface of the resistive portion RSH may be modified in various ways.

The resistive portion RSH may be divided into two pieces which are electrically connected respectively to the electrodes at both ends of the resistive surface RY.

When the input surface 13 is formed as a rectangle which is longer in the longitudinal direction, it goes without saying that the resistive portion RSH may be formed on the side of the input detecting member 2.

While specific illustrated embodiments have been shown and described, it will be appreciated by those skilled in the art that various modifications, changes and additions can be made to the invention without departing from the spirit and scope thereof as set forth in the following claims.

What is claimed is:

1. A coordinate input device comprising:

an input surface in the form of a rectangle formed by overlapping a first input detecting member and a second input detecting member so that they will not contact each other, first and second electrodes being provided on both side portions at the shorter sides of a rectangular resistive surface of said first input detecting member, a voltage being applied between said first and second electrodes, third and fourth electrodes being provided on both side portions at the longer sides of a rectangular resistive surface of said second input detecting member, a fifth electrode being connected to said fourth electrode through a resistive portion, a voltage being applied between said second and fifth electrodes, the resistive surfaces of the first and second input detecting members contacting each other at an area on said input surface which has been pushed, the coordinate of the input in the X-Y coordinate system on said input surface being obtained from the resistance at said first or second electrode of said first input detecting member and the resistance detected at said second or fifth electrode of said second input detecting member at that time; and at least one face-plate switch formed by overlapping at least one first face-plate switch conductor portion and at least a second switch conductor portion so that they will not contact each other, said first switch conductor portion being electrically connected to a predetermined position in the area extending from said first electrode of said first input detecting member through the resistive portion up to said second electrode, said second switch conductor portion being electrically connected to a predetermined position in the area extending from said fourth electrode of said second input detecting member through the resistive portion up to said fifth electrode, wherein when a push on said face-plate switch causes said first and second face-plate switch conductor portions to contact each other, the input using said face-plate switch is detected from the resistance detected at said second or fifth electrode of said second input detecting member.

2. The coordinate input device according to claim 1, wherein if the ratio of the number of coordinate pixels in the direction of the shorter sides of said input surface to the number of coordinate pixels in the direction of the longer sides is n:m, the ratio of the resistance of the resistive surface between said third and fourth electrodes of said second input detecting member to the resistance of the resistive portion provided between said fourth and fifth electrodes is n:{(m/k)−n} where k=1, 2, . . . .

3. The coordinate input device according to claim 1, further comprising a first switching means for selectively applying a voltage to said first and second input members, a second switching means for selectively grounding said first and second input members, a third switching means for selectively taking out resistance obtained from said first or second electrode of said first input detecting member or resistance obtained from said third or fifth electrode of said second input detecting member, and a control means for controlling said first, second, and third switching means, wherein said control means controls said first, second, and third switching means in a predetermined cycle.

4. The coordinate input device according to claim 3, wherein said control means switches said first switching means so that a voltage is applied to said first input detecting member, switches said second switching means so that said first input detecting member is grounded, and switches said third switching means so that the resistance obtained from said first or second electrode of said first input detecting member is obtained in a first period, and switches said first switching means so that a voltage is applied to said second input detecting member, switches said second switching means so that said second input detecting member is grounded, and switches said third switching means so that the resistance obtained from said third or fifth electrode of said second input detecting member is obtained in a second period that follows said first period.

5. The coordinate input device according to claim 1, wherein said resistive portion is formed of the same resistive material as that constituting the resistive surface of said second input detecting member.

6. The coordinate input device according to claim 1, wherein said resistive portion and the resistive surface of said second input detecting member are formed using the same printing process.

7. The coordinate input device according to claim 6, wherein if the ratio of the number of coordinate pixels in the direction of the shorter sides of said input surface to the number of coordinate pixels in the direction of the longer sides is n:m, the ratio of the resistance of the resistive surface between said third and fourth electrodes of said second input detecting member to the resistance of the resistive portion provided between said fourth and fifth electrodes is n:{(m/k)−n} where k=1, 2, . . . .

8. The coordinate input device according to claim 6, further comprising a first switching means for selectively applying a voltage to said first and second input members, a second switching means for selectively grounding said first and second input members, a third switching means for selectively taking out resistance obtained from said first or second electrode of said first input detecting member or resistance obtained from said third or fifth electrode of said second input detecting member, and a control means for controlling said first, second, and third switching means, wherein said control means controls said first, second, and third switching means in a predetermined cycle.

9. The coordinate input device according to claim 8, wherein said control means switches said first switching means so that a voltage is applied to said first input detecting member, switches said second switching means so that said first input detecting member is grounded, and switches said third switching means so that the resistance obtained from said first or second electrode of said first input detecting member is obtained in a first period, and switches said first switching means so that a voltage is applied to said second input detecting member, switches said second switching means so that said second input detecting member is grounded, and switches said third switching means so that the resistance obtained from said third or fifth electrode of said second input detecting member is obtained in a second period that follows said first period.

* * * * *